United States Patent [19]

Tsuchida

[11] Patent Number: 5,146,331
[45] Date of Patent: Sep. 8, 1992

[54] APPARATUS FOR ADJUSTING PICTURE QUALITY OF HIGH DEFINITION TELEVISION SIGNALS OF EITHER STANDARD OR WIDE ASPECT RATIOS DISPLAYED ON A WIDE ASPECT RATIO DISPLAY

[75] Inventor: Susumu Tsuchida, Tokyo, Japan

[73] Assignee: Sony Corporation, Tokyo, Japan

[21] Appl. No.: 666,600

[22] Filed: Mar. 8, 1991

[30] Foreign Application Priority Data

Mar. 13, 1990 [JP] Japan .................................. 2-59969

[51] Int. Cl.⁵ .................. H04N 5/262; H04N 5/46; H04N 7/01; H04N 5/57
[52] U.S. Cl. .................................... 359/169; 358/141
[58] Field of Search .............. 358/169, 140, 142, 141, 358/11, 12

[56] References Cited

U.S. PATENT DOCUMENTS

| | | | |
|---|---|---|---|
| 4,581,640 | 4/1986 | Cole | 358/142 |
| 4,670,783 | 6/1987 | Nadan | 358/141 |
| 4,984,078 | 1/1991 | Skinner | 358/141 |
| 4,984,081 | 1/1991 | Miyoshi | 358/181 |
| 5,001,551 | 3/1991 | Otto | 358/141 |
| 5,014,116 | 5/1991 | Kawai | 358/141 |

FOREIGN PATENT DOCUMENTS 165983 8/1985 Japan .

*Primary Examiner*—Tommy P. Chin
*Attorney, Agent, or Firm*—Lewis H. Eslinger; Jay H. Maioli

[57] ABSTRACT

An image display device including picture quality adjustment circuitry is adapted so that a selected one of an input video signal of a standard aspect ratio order an input video signal of a wide aspect ratio is input thereto, and a display having a wide aspect ratio screen for displaying an image of a video signal to which picture quality adjustment processing by the picture quality adjustment circuitry is implemented, wherein a scheme is employed to alter characteristics such as sharpness adjustment processing, etc. applied to the input video signal, thereby permitting picture qualities of display images of various aspect ratios to be optimized.

8 Claims, 3 Drawing Sheets

APPARATUS FOR ADJUSTING PICTURE QUALITY OF HIGH DEFINITION TELEVISION SIGNALS OF EITHER STANDARD OR WIDE ASPECT RATIOS DISPLAYED ON A WIDE ASPECT RATIO DISPLAY

BACKGROUND OF THE INVENTION

1. Field of the Invention

This invention relates to an image display device such as a television image receiver including a wide aspect ratio screen, and more particularly to an image display device adapted to display, on the wide aspect ratio screen, an image of a video signal to which picture quality adjustment processing is implemented by picture quality adjustment means to which either an input video signal of a standard aspect ratio or an input video signal of a wide aspect ratio is input.

2. Description of the Related Art

Hitherto, image display devices, e.g., television image receivers for displaying an image by a video signal with display means such as a cathode ray tube (CRT) or a liquid crystal display have been widely known. In such image display devices, a technique is employed to implement picture quality adjustment processing such as a sharpness adjustment or a contrast adjustment to a video signal, thereby making it possible to provide a display image having excellent picture quality by using display means such as the above-mentioned CRT or the like.

Meanwhile, in the existing television broadcasting, the lateral-to-longitudinal ratio (aspect ratio) of the display screen is set to 4:3. However, in an EDTV (extended definition TV) broadcasting of the second generation which will be put into practice in the future, a high definition television broadcasting such as a high vision or the like, planning is made to widen the aspect ratio of the screen so that it is equal to 16:9.

Accordingly, it is foreseen in the future that the television broadcasting of the wide aspect ratio of 16:9 will be conducted in addition to the existing television broadcasting of the standard aspect ratio of 4:3. For this reason, image display devices capable of displaying images of both video signals are being developed at present.

In such image display devices, as the system in which e.g., display means of the wide aspect ratio of 16:9 is used to display an image of a video signal of the standard aspect ratio of 4:3, the following systems have been proposed.

Namely, the first system is, as shown in FIG. 1A, the system called a standard mode to implement a processing such that a picture $P_1$ of a video signal of the standard aspect ratio falls within the wide aspect ratio screen to mask both left and right side regions $P_2$ and $P_3$. In this standard mode, a video signal of the standard aspect ratio is subjected to time base compression so that it is reduced to $\frac{3}{4}$ in a horizontal direction in correspondence with a difference of the aspect ratio with respect to a display picture of the wide aspect ratio to add, in the both the left and right side regions of that video signal, mask signals displayed, e.g., by black, thus to effect display in accordance with deflection of the same raster scanner as in the ordinary case.

Further, the second system, as shown in FIG. 1B, called a top and bottom cut mode in which respective top and bottom regions $P_4$ and $P_5$ of an image of a video signal of the standard aspect ratio are cut, but the image $P_6$ is displayed on the entire with of the display screen. In the case of the top and bottom cut mode, over scan is applied to deflection in the upper and lower directions without processing the video signal of the standard aspect ratio to effect display.

Meanwhile, it is now assumed that, in an image display device adapted to display an image of the wide aspect ratio and an image of the standard aspect ratio by using a wide aspect ratio screen, an image of the standard aspect ratio is displayed on the wide aspect ratio screen in the above-described standard mode or top and bottom cut mode. Under this circumstance, even in the case where an image of an input video signal of the wide aspect ratio is satisfactorily displayed, the picture quality of other images may be disadvantageously degraded for the reason described below.

Namely, in order to display an image by a video signal of the standard aspect ratio on the wide aspect ratio screen in the standard mode as shown in FIG. 1A, it is necessary to implement time base processing to compress the time base of a video signal so that it is reduced to $\frac{3}{4}$ in a horizontal direction. A display image in the standard mode is such that the frequency component of a video signal is 4/3 times larger than the original one by the time base processing, resulting in insufficient sharpness of picture.

When it is assumed that an image from a video signal of the standard aspect ratio is displayed on the wide aspect ratio screen in the top and bottom cut mode as shown in FIG. 1B, the number of effective scanning lines serving as a display picture changes from 480 to 360. For this reason, the luminance of the picture is reduced to $\frac{3}{4}$, resulting in a darker picture.

OBJECT AND SUMMARY OF THE INVENTION

It is an object of the present invention to provide an image display device including picture quality adjustment means adapted so that a switched one of an input video signal of the standard aspect ratio and an input video signal of the wide aspect ratio is input thereto, and display means of a wide aspect ratio for displaying an image of a video signal to which picture quality adjustment is implemented by the picture quality adjustment means, wherein a technique is employed to implement suitable picture quality adjustment processing to a video signal, thereby making it possible to display images of respective aspect ratios under the state of a satisfactory picture quality.

Thus, in order to achieve this object according to the present invention, an image display device for displaying a television signal in plural formats comprises first receiving means for receiving a first television signal of standard aspect ratio, second receiving means for receiving a second television signal of wide aspect ratio, detecting means for detecting a type of received television signals, display means having a screen of wide aspect ratio for displaying an image in dependency upon the received television signal, and picture quality adjustment means including a sharpness adjustment the means for adjusting picture quality of the displayed image depending upon the kind of received television signal.

In the image display device according to this invention, sharpness adjustment processing of a characteristic corresponding to an aspect ratio of an image displayed on the wide aspect ratio screen of the display means is implemented to an input video signal by the sharpness adjustment means provided in the picture quality adjustment means to allow an emphasis frequency band of an input video signal of the wide aspect ratio to be higher than a frequency band of an input video signal of the standard aspect ratio to thereby make it possible to render the characteristic of an optimum sharpness adjustment to images of the standard aspect ratio and the wide aspect ratio, thus to permit the picture qualities of respective display images to be optimum.

Further, in the image display device according to this invention, time base compression processing is implemented to an input video signal of the standard aspect ratio by the time base compression processing means, thereby making it possible to carry out an image display in the standard mode on the wide aspect ratio screen of the display means. In addition, sharpness adjustment processing of a characteristic corresponding to a compression ratio in the time base compression processing means is implemented to an input video signal of the standard aspect ratio to which the time base compression processing has been implemented by the sharpness adjustment means provided in the picture quality adjustment means, thus making it possible to compensate insufficiency in sharpness resulting from the time base compression processing in the standard mode, and to carry out an image display having a satisfactory picture quality in the standard mode on the wide aspect ratio screen of the display means.

Furthermore, in the image display device according to this invention, not only an image display in the standard mode can be carried out on the wide aspect ratio screen of the display means, but also an image display in the top and bottom cut mode on the wide aspect ratio screen by switching the quantity of scanning lines in a vertical direction of the display means by using the scanning control means. In addition, in the top and bottom cut mode, by using the contrast adjustment means provided in the picture quality adjustment means to implement, to an input video signal, contrast adjustment processing of a characteristic corresponding to a quantity of scanning lines in a vertical direction of the display means by the scanning control means, it is possible to compensate lowering of the luminance level due to changes in the quantity of scanning lines in a vertical direction of the display means, and to carry out an image display having a satisfactory picture quality in the top and bottom cut mode on the wide aspect ratio screen of the display means.

For this reason, even in the case where an image of a video signal of the standard aspect ratio is displayed in a mode provided, e.g., by switching between the standard mode and the top and bottom cut mode, this image display device can provide an optimum sharpness characteristic or contrast characteristic in the respective modes. In addition, if respective images are switched back and forth and displayed, there results only a small difference in the picture quality, leading to no possibility that a sense of incompatibility is rendered to a viewer.

The aforementioned and other objects, features and advantages of the present invention will become clear from the following description of the preferred embodiments thereof, taken in conjunction with the accompanying drawings.

BRIEF DESCRIPTION OF THE DRAWINGS

FIGS. 1A and 1B are model views showing the case where an image of the standard aspect ratio is displayed on the wide aspect ratio screen, respectively, wherein FIG. 1A shows a display image in the side mask mode and FIG. 1B shows a display image in the top and bottom cut mode.

DESCRIPTION OF PREFERRED EMBODIMENT

An embodiment of this invention will now be described with reference to the attached drawings.

Figure 2:
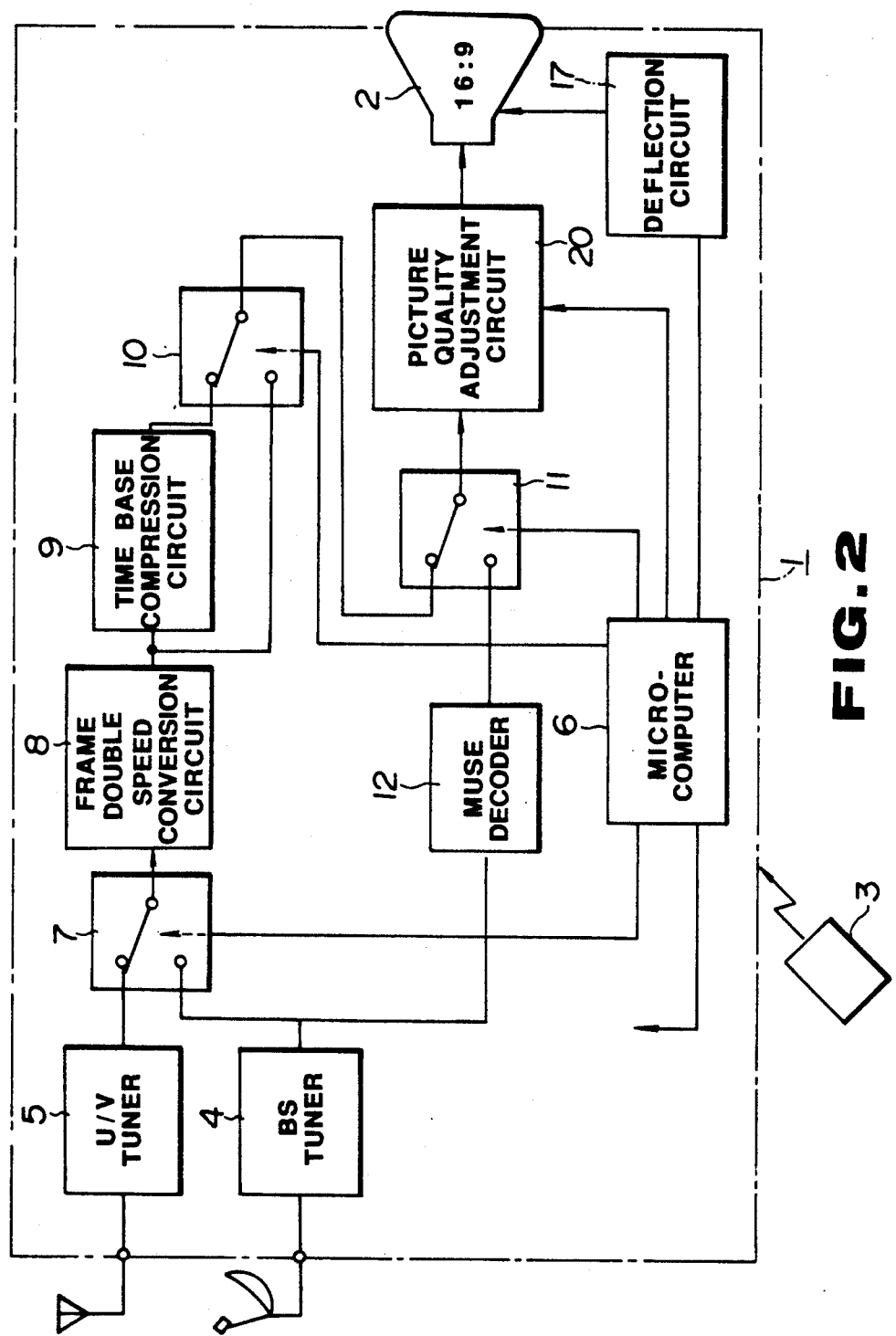
FIG. 2 is a block diagram showing the configuration of an image display device according to this invention.

FIG. 2 is a block diagram of an image display device (1) of this embodiment.

This image display device (1) includes an image receiving tube (2) having a screen of a wide aspect ratio of 16:9, and serves to display, on the wide aspect ratio screen of the image receiving tube (2), respective broadcasting images received by a broadcasting satellite tuner (4) or a ground wave tuner (5) in accordance with an instruction from a user by a remote controller (3) or the like. In the image display device (1), selection of video signals of the above-mentioned broadcasts, the operating controls of respective sections corresponding thereto, the picture quality adjustment processing control, the deflection angle control of the image receiving tube (2), and the like are carried out by a system controller (6) in accordance with an instruction from the user.

Initially, explanation will be given in connection with the case where the user instructs an audio-visual operation of a broadcast based on the existing NTSC system of the standard aspect ratio of 4:3.

In this case, by a control by the system controller (6) in conformity with an instruction from the user, a video signal of a desired channel is received by the ground wave tuner (5), and is delivered to a frame double speed conversion circuit (8) through a switching circuit (7). Further, in the case of receiving a broadcast of the NTSC system delivered from a satellite, by the control by the system controller (6), a video signal of a desired channel is received by the broadcasting satellite tuner (4), and is delivered to the frame double speed conversion circuit (8) through the switching circuit (7).

This frame double speed conversion circuit (8) converts the scanning system of the video signal of the NTSC system delivered through the switching circuit (7) from the interlace scanning to the sequential scanning by the frame double speed conversion to output the video signal base on the sequential scanning. In this embodiment, by implementing various picture quality improvement processing proposed in the IDTV system, etc. at the frame double speed conversion circuit (8) in addition to the above-mentioned frame double speed conversion, the picture quality of the NTSC video signal is improved.

A video signal outputted from the frame double speed conversion circuit (8) is delivered to a time base compression circuit (9), at which the time base in a horizontal direction is compressed into a time base ⅘ times smaller so that an image displayed on the wide aspect ratio screen of the image receiving tube (2) that is different in aspect ratio is not distorted. In the case where a user selects an image display state in the standard mode, a video signal to which the time base compression processing is implemented at the time base compression circuit (9) is delivered to a picture quality adjustment circuit (20) through respective switching circuits (10) and (11) under control of the system controller (6). Further, in the case where the user selects an image display state in the top and bottom cut mode, a video signal output from the frame double speed conversion circuit (8) is delivered to the picture quality adjustment circuit (20) through the respective switching circuits (10) and (11) as it is.

On the other hand, in the case where a user instructs an audio-visual operation of a high vision broadcast from a satellite, by the control of the system controller (6), a MUSE signal received by the broadcasting satellite tuner (4) is decoded at a MUSE decoder (12), and is delivered to the picture quality adjustment circuit (20) through the switching circuit (11).

Figure 3:
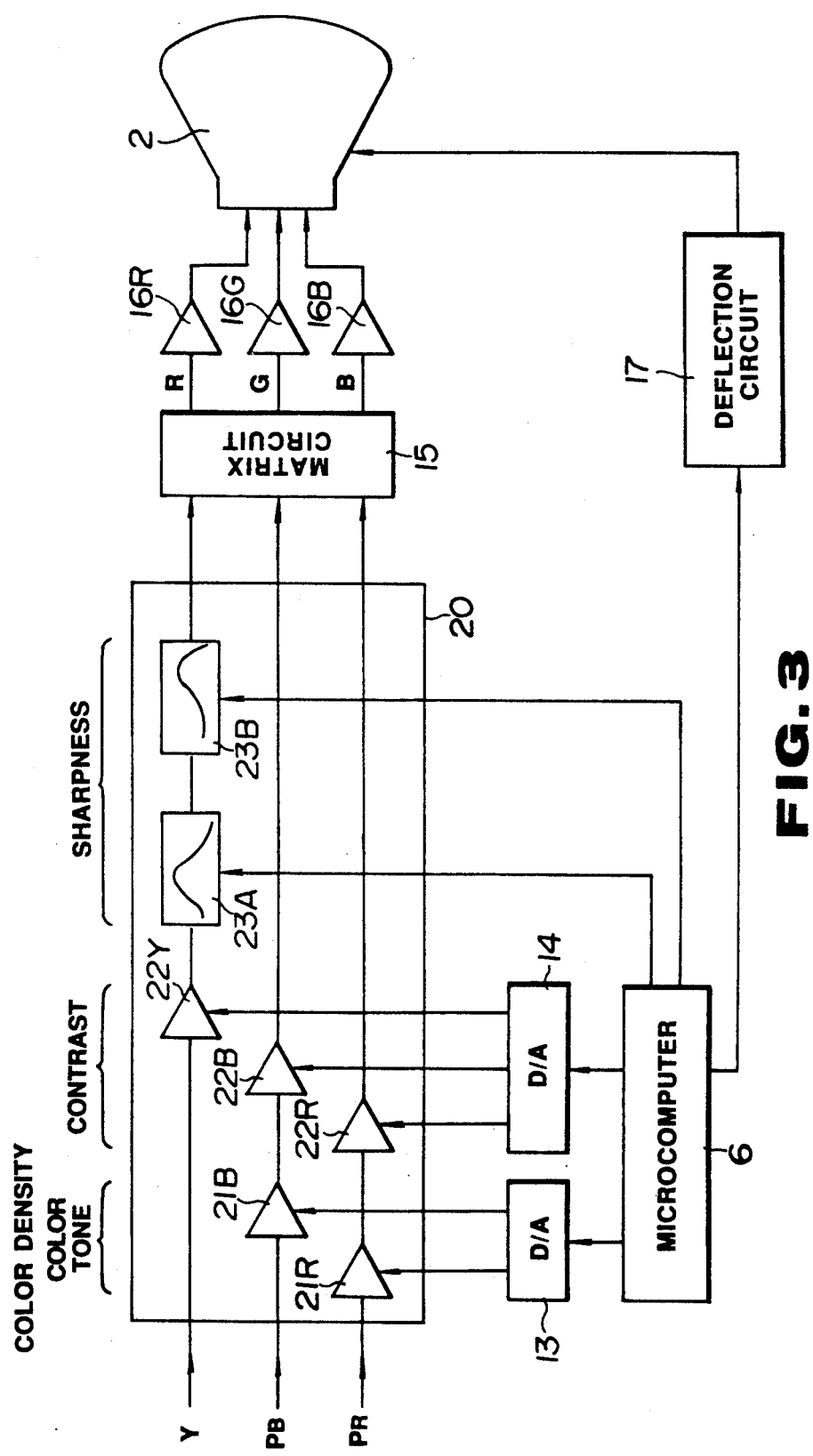
FIG. 3 is a block diagram showing the configuration of the picture quality adjustment circuit of the above-mentioned image display device.

FIG. 3 is a block diagram showing the configuration of the picture quality adjustment circuit (20).

The picture quality adjustment circuit (20) is adapted to implement signal processing for adjustment of picture quality to an input video signal separated into a luminance signal Y and respective color signals $P_B$ and $P_R$ of B-Y and R-Y and delivered thereto at respective level conversion circuits (21B), (21R), (22Y), (22B) and (22R) and respective characteristic conversion circuits (23A) and (23B) in accordance with the control by the system controller (6) to output the video signal thus processed.

The above-mentioned level conversion circuits (21B) and (21R) suitably control color levels of the color signal $P_B$ and $P_R$ in accordance with control signals delivered from the system controller (6) through a digital/analog (D/A) conversion circuit (13), respectively, to thereby adjust color density or color tone of an image displayed on the image receiving tube (2).

Further, the level conversion circuits (22Y), (22B) and (22R) suitably control contrast levels of the respective signals Y, $P_B$ and $P_R$ in accordance with control signals respectively delivered from the system controller (6) through a digital-to-analog (D/A) conversion circuit (14), respectively, to thereby adjust the contrast of an image displayed on the screen of the image receiving tube (2).

Further, the characteristic conversion circuits (23A) and (23B) control the frequency characteristics of the low frequency band component and the high frequency band component of the luminance signal Y in accordance with control signals delivered from the system controller (6), respectively, to thereby adjust sharpness of an image displayed on the wide aspect ratio screen of the image receiving tube (2).

The luminance signal Y and the respective color signals $P_B$ and $P_R$ to which signal processing for adjustment of picture quality is implemented at the respective level conversion circuits (21B), (21R), (22Y), (22B) and (22R) and the respective characteristic conversion circuits (23A) and (23B) are outputted from the picture quality adjustment circuit (20) and delivered to a matrix circuit (15), at which they are converted to video signals of the three primary colors R, G and B. Thereafter, these video signals thus obtained are delivered to the image receiving tube (2) through respective drivers (16R), (16G) and (16B), and are displayed on the wide aspect ratio screen of the image receiving tube (2).

Further, the deflection system of the image receiving tube (2) is driven by the deflection circuit (17) controlled by the system controller (6), and the deflection angle of the image receiving tube (2), or the like is controlled in dependency upon the aspect ratio of an image displayed on the screen.

In such an image display device (1), under control of the system controller (6), and depending upon the kind of images displayed on the wide aspect screen of the image receiving tube (2), the contents of the contrast adjustment and the sharpness adjustment implemented to a video signal at the picture quality adjustment circuit (20) are altered as follows.

Figure 1A:
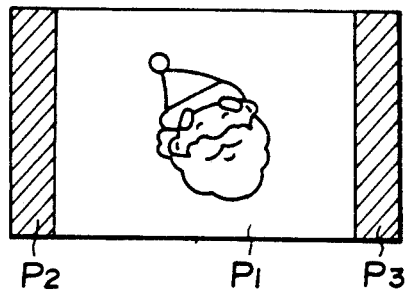
Figure 1B:
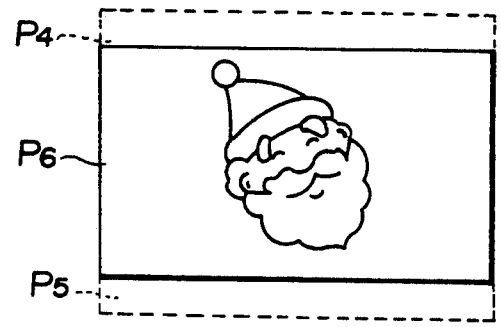
Figure 4:
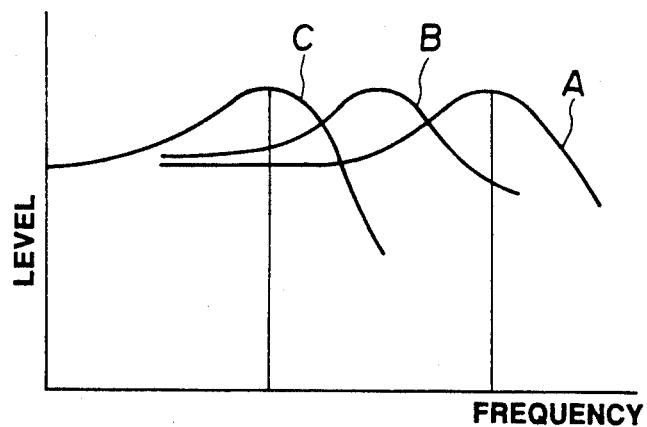
FIG. 4 is a frequency characteristic diagram showing a frequency characteristic given to an input video signal by the sharpness processing of the picture quality adjustment circuit.

Namely, in the case of displaying an image of high vision of the wide aspect ratio on the wide aspect ratio screen of the image receiving tube (2), the level conversion circuits (22Y), (22B) and (22R) for adjustment of contrast constituting the picture quality adjustment circuit (20) are set so that they have predetermined standard levels (100%), respectively. Further, the characteristics conversion circuit (23B) for the high frequency band component of the respective characteristic conversion circuits (23A) and (23B) for adjustment of sharpness is placed in an operating state. Thus, as indicated by the characteristic curve A in FIG. 4, a frequency characteristic to provide emphasis (160%) over a broad band up to the high frequency band component is given to the luminance signal Y delivered to the picture quality adjustment circuit (20). For this reason an image like that in high vision of high resolution providing satisfactory details can be displayed on the wide aspect ratio screen of the image receiving tube 2.

Further, in the case of displaying an image of the NTSC system of the standard aspect ratio on the wide aspect ratio screen of the image display tube (2), respective level conversion circuits (22Y), (22B) and (22R) for adjustment of contrast constituting the picture quality adjustment circuit (20) are set to have standard levels (100%), respectively. Further, respective characteristic conversion circuits (23A) and (23B) for adjustment of sharpness are both placed in an operating state. Thus, as indicated by the characteristic curve B in FIG. 4, a frequency characteristic to emphasize the high frequency component to some extent (140%) is given to the luminance signal Y delivered to the picture quality adjustment circuit (20). For this reason, sharpness typically degraded as the result of the fact that time base of a video signal is compressed at the time base compression circuit (9) is compensated. Thus, an image of an optimum sharpness can be displayed on the wide aspect ratio screen of the image receiving tube (2).

Furthermore, in the case of displaying an image of the NTSC system of the standard aspect ratio on the wide aspect ratio screen of the image receiving tube in the top and bottom cut mode, level conversion circuits (22Y), (22B) and (22R) for adjustment of contrast constituting the picture quality adjustment circuit (20) are set to a high level (140%), respectively. Thus, the contrasts of the respective color signals $P_B$ and $P_R$ delivered to the picture quality adjustment circuit (20) are emphasized. Further, in this case, the characteristic conversion circuit (23A) for the low frequency band component of the respective characteristic conversion circuits (23A) and (23b) for adjustment of sharpness is placed in an operating state. As indicated by the characteristic curve C in FIG. 4, a frequency characteristic to emphasize (100%) an ordinary signal band of the NTSC system is given to the luminance signal Y delivered to the picture quality adjustment circuit (20). Accordingly, since an original image is displayed on the screen of the image receiving tube (2) having a different aspect ratio with the upper and lower parts thereof being cut, a decreased luminance is compensated. Thus, an image of an optimum luminance can be displayed on the wide aspect ratio screen of the image receiving tube (2).

In the manner stated above, this image display device (1) suitably changes the content of the picture quality adjustment processing applied to a video signal at the picture quality adjustment circuit (20) depending upon the kind of images displayed on the wide aspect ratio screen of the image receiving tube (2). For this reason, it is possible to implement optimum picture quality adjustment processing to respective video signals adapted for an image of the wide aspect ratio displayed on a wide aspect ratio image display tube (2), an image of the standard aspect ratio based on the standard mode, and an image of the wide aspect ratio based on the top and bottom cut mode from a video signal of the standard aspect ratio thereafter to display such images on the wide aspect ratio screen of the image display tube (2). Thus, the picture qualities of images can be optimized. Further, since the picture qualities of respective images can be optimized in this way, even if switching between images mentioned above is made to display a switched one on the wide aspect ratio screen of the image receiving tube 2, there results only a small difference between picture qualities, removing the possibility that a sense of incompatibility is rendered to a viewer.

What is claimed is:

1. An image display device for displaying television signals received in different aspect ratio formats comprising;
   first receiving means for receiving a first television signal of a standard aspect ratio,
   second receiving means for receiving a second television signal of a wide aspect ratio,
   detecting means for detecting a type of said received first and second television signals,
   display means having a screen of the wide aspect ratio for displaying an image in the standard aspect ratio or the wide aspect ratio in response to the received television signal, and
   picture quality adjustment means for adjusting picture quality of the displayed image differently dependent upon the detected type of received television signal, said picture quality adjustment means including a sharpness adjustment means for adjusting the sharpness of the displayed image.

2. An image display device according to claim 1, which further comprises the base compression processing means connected to said first receiving means for time base compressing said first television signal of a standard aspect ratio, and
   wherein said sharpness adjustment means includes a circuit for altering an emphasis frequency band of said first television signal in dependency upon a compression ratio in said time base compression processing means.

3. An image display device according to claim 2, wherein said time base compression processing means time base compresses said first television signal in a horizontal direction.

4. An image display device according to claim 2 further comprising,
   scanning control means for changing the number of scanning lines in a vertical direction of said display means, and
   wherein said picture quality adjustment means includes contract adjustment means, in which a contrast characteristic of said contrast adjustment means is altered in dependency upon the number of scanning lines.

5. An image display device according to claim 4, in which
   a portion of said first television signal is displayed on said screen in a second mode, said second mode having a display signal scanning a display area on said screen, so as to be visible, and having a non display signal scanning upper and lower portions of said screen, so as not to be visible.

6. An image display device according to claim 5, wherein said contrast adjustment means operates in said second mode so that a level of contrast of said first television signal is higher than a level of contrast of said second television signal.

7. An image display device according to claim 1, wherein said standard aspect ratio is equal to 4:3 and said wide aspect ratio is equal to 16:9.

8. An image display device according to claim 1, wherein said first television signal is based on NTSC television format and said second television signal is based on MUSE television format.

* * * * *